(12) United States Patent
Lam et al.

(10) Patent No.: US 10,311,597 B2
(45) Date of Patent: Jun. 4, 2019

(54) APPARATUS AND METHOD OF DETERMINING A BONDING POSITION OF A DIE

(71) Applicant: ASM Technology Singapore Pte Ltd, Singapore (SG)

(72) Inventors: Kui Kam Lam, Hong Kong (HK); Shun Ming Fung, Hong Kong (HK); Chi Keung Leung, Hong Kong (HK); Wing Kin Lam, Hong Kong (HK); Yuet Cheung, Hong Kong (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 119 days.

(21) Appl. No.: 15/611,910

(22) Filed: Jun. 2, 2017

(65) Prior Publication Data

US 2018/0350097 A1    Dec. 6, 2018

(51) Int. Cl.
*G06T 7/73*    (2017.01)

(52) U.S. Cl.
CPC ...... *G06T 7/73* (2017.01); *G06T 2207/10004* (2013.01); *G06T 2207/30148* (2013.01)

(58) Field of Classification Search
CPC ... G06T 7/73; G06T 7/70; G06T 2207/10004; G06T 2207/30148; Y10S 294/907
See application file for complete search history.

(56) References Cited

U.S. PATENT DOCUMENTS

| | | | | |
|---|---|---|---|---|
| 5,547,537 | A | * | 8/1996 | Reynolds .......... H01L 21/67144 156/351 |
| 6,640,423 | B1 | * | 11/2003 | Johnson ............ H01L 21/67144 29/721 |
| 2010/0125348 | A1 | * | 5/2010 | Chung ............... G05B 19/4015 700/58 |
| 2012/0128229 | A1 | * | 5/2012 | Sucro ...................... H01L 24/78 382/145 |
| 2013/0004269 | A1 | * | 1/2013 | Van Zwet .............. B25J 9/1697 414/222.02 |
| 2015/0187617 | A1 | * | 7/2015 | Leung ............... H01L 21/67144 228/33 |

* cited by examiner

*Primary Examiner* — Ali Bayat
(74) *Attorney, Agent, or Firm* — Ostrolenk Faber LLP

(57) ABSTRACT

The invention provides an apparatus for determining a bonding position of a die. The apparatus includes a bond head for picking up and bonding the die. The apparatus further includes a plurality of cameras positioned and configured for capturing at least a first image including a first side surface of the die, a second image including a second side surface of the die and a third image including the first and second side surfaces of the die. Further, the invention provides a method of determining a bonding position of a die. The method captures at least a first image including a first side surface of the die, a second image including a second side surface of the die and a third image including the first and second side surfaces of the die. The method further determines a bonding position of the die based on the captured images.

18 Claims, 3 Drawing Sheets capturing, when the die is being held by the bond head, at least a first image comprising a first side surface of the die, a second image comprising a second side surface of the die and a third image comprising the first and second side surfaces of the die

↓ determining a bonding position of the die based on the plurality of captured images

APPARATUS AND METHOD OF DETERMINING A BONDING POSITION OF A DIE

TECHNICAL FIELD

Various aspects of this disclosure relate to an apparatus and to a method of determining a bonding position of a die for improving bonding accuracy.

BACKGROUND

Conventional die attach machines are used in automated semiconductor equipment to accurately deliver components, such as semiconductor dice, onto semiconductor substrates (e.g., lead frames). An example of such conventional die attach machines is a die bonding machine, which transfers cut or sawn wafer dice or chips from a wafer table onto a substrate in a pick-and-place operation. Typically, a bonding device having a bond arm and a bond head is used to perform a pick-and-place operation.

During a pick-and-place motion, in order to ensure the placement and rotation accuracy, usually alignment is performed between a pick-up position and a placement position. At the pick-up position, the bonding device using the bond head detaches a die from for example an adhesive tape on which the die is mounted. In conventional methods for die rotation recognition and die center measurement, an up-look camera is used. To capture an image of edges of the die from a bottom side of the die, the bond arm holding the die using the bond head, moves to an up-look position or photo capture position after picking up the die and before placing the die at a target position. At the up-look position, the die is typically placed at a station for measurement of the orientation of the die. A mirror and a look-up camera located underneath the die are commonly used to capture an image of the die from a bottom side thereof. The mirror is positioned to project an image of the die to the look-up camera. At the up-look position a two dimensional image (also referred to herein as a 2D image) of a bottom surface of the die is captured. The bottom surface of the die is referred to herein as a surface of a die facing away from the bond head.

For a precise bonding, it is important that the die to be bonded is correctly aligned before bonding and that a bonding position, for example a center of the die, is reliably determined. Conventionally, the center and the orientation of the die are calculated from 2D image data captured by an up-look camera. Before bonding the die at the bonding position and during movement of the die from the up-look position to the bonding position, the bond head is used to adjust orientation of the die, for example an angle about the Z-axis of the bond head, and an X-Y-position of the die in an Cartesian X, Y, Z coordinate system stated in metric units.

However, this approach, which relies on the bottom edges of the die, imparts an uncertainty and variation in determining the position of the die and a center of the die. Since semiconductor dice are usually sawn from a wafer, edges of the dice are often not even after the sawing process. In particular, the shapes of top and bottom surfaces of a die may differ from each other. Illustratively, after a sawing process, the die does not have a shape of a rectangle from a side view, but may rather have a shape of a trapezoid. That means a width of the die at a bottom surface of the die may be smaller than a width of the die at a top surface of the die, or vice versa. When the center of the die is calculated from a 2D image captured from a bottom side of the die, the shape of the die at a top side thereof is not taken into account. Thus, calculation of the center of a die according to the prior art typically does not take into account the shape of the die at a top surface thereof.

Consequently, since the die is not correctly aligned, electrical contacts at a bottom surface of the die may not be correctly aligned to bonding contacts on a substrate in a bonding process due to misalignment of the die with bonding contacts on the substrate. Moreover, problems may occur when a die is bonded in a misaligned manner on a substrate by the bond head, and, thus, loss of productivity may result. Thus, errors in the calculation of a center of the die occur due to differences between the top and bottom surfaces of the die. As a result, the bottom surface of the die is not reliable for calculating a center of the die. In addition, an up-look station including an up-look camera is needed between the die picking and bonding positions. Therefore, additional time is spent at the up-look station leading to the loss of throughput and resulting in higher costs.

SUMMARY

Accordingly, various aspects of this disclosure provide an improved apparatus and a method of calculating a bonding position of a die which address or alleviate the above mentioned issues. Furthermore, the optimized apparatus may improve placement accuracy at a placement position, resulting in a reduction of defects. In addition, by using side-look 3D stereo optics, a midpoint of a Z-level of a die is measurable, which means determining a midpoint of the thickness of the die, allowing for elimination of bottom die edge variation from a sawing process during calculations. In addition, various aspects of this disclosure do not require an up-look station including an up-look camera as implemented in conventional die attach machines. As a consequence, a number of parts of the apparatus may be reduced. Additionally, using side-looking cameras together with on-the-fly image capturing, loss of throughput is minimized and cycle time is reduced. Further, the result is more reliable.

Accordingly, various aspects of this disclosure provide an apparatus for determining a bonding position of a die. The apparatus includes a bond head for picking up and bonding the die. Furthermore, the apparatus includes a plurality of cameras positioned and configured for capturing, when the die is being held by the bond head, at least a first image including a first side surface of the die, a second image including a second side surface of the die and a third image including the first and second side surfaces of the die.

Various aspects of this disclosure further provide a method of determining a bonding position of a die. The method captures, when the die is being held by the bond head, at least a first image including a first side surface of the die, a second image including a second side surface of the die and a third image including the first and second side surfaces of the die. Further, the method determines a bonding position of the die based on the first image, the second image, and the third image.

It will be convenient to hereinafter describe various embodiments in greater detail by reference to the accompanying drawings. The particularity of the drawings and the related description is not to be understood as superseding the generality of the broad identification of the invention as defined by the claims.

BRIEF DESCRIPTION OF THE DRAWINGS

The invention will be readily appreciated by reference to the detailed description when considered in conjunction with the non-limiting examples and the accompanying drawings, in which.

DETAILED DESCRIPTION

Figure 3:
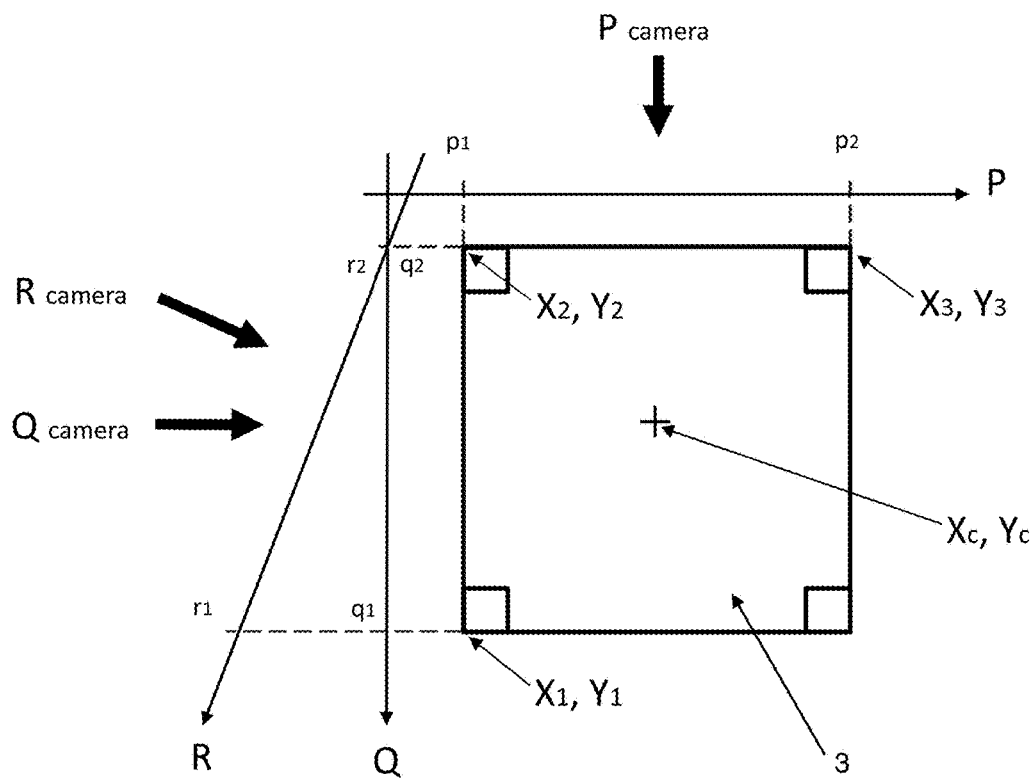
FIG. 3 shows a schematic plan view of the die of FIG. 2.
Figures 4, 5:
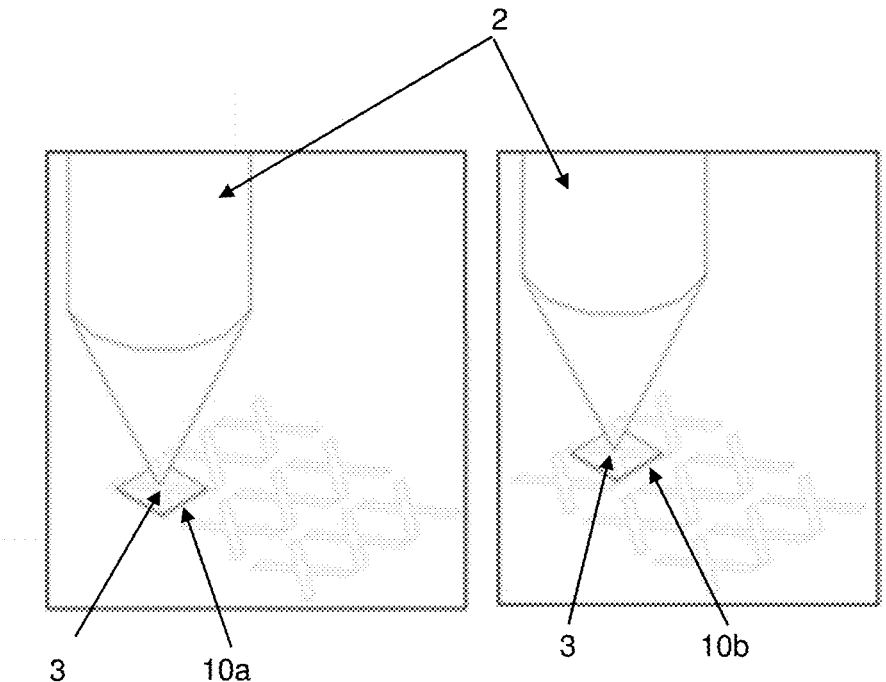
FIG. 4 shows enlarged isometric views of a bond head holding the die of FIGS. 2 and 3.
FIG. 5 illustrates a method of calculating a center of a die using the apparatus according to the preferred embodiment of the invention.

Various embodiments will now be described with reference to FIG. 1A to FIG. 3. Further embodiments will be described with reference to FIG. 4. FIG. 5 relates to a method according to various embodiments.

Figure 1A:
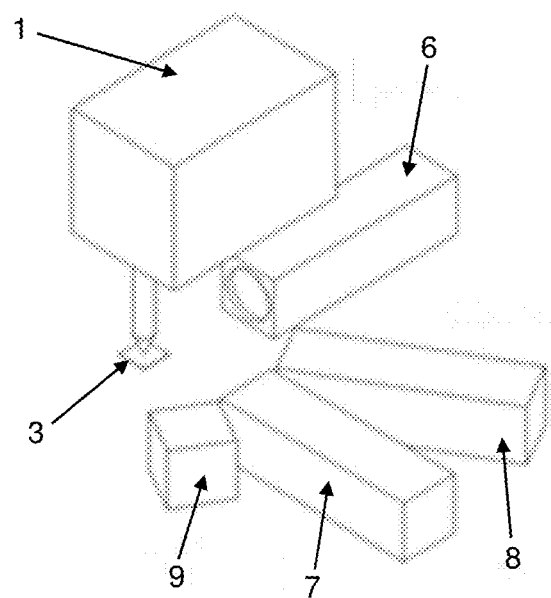
FIG. 1A schematically shows an isometric view of an apparatus for determining a bonding position of a die in accordance with the preferred embodiment of the invention.
Figure 1B:
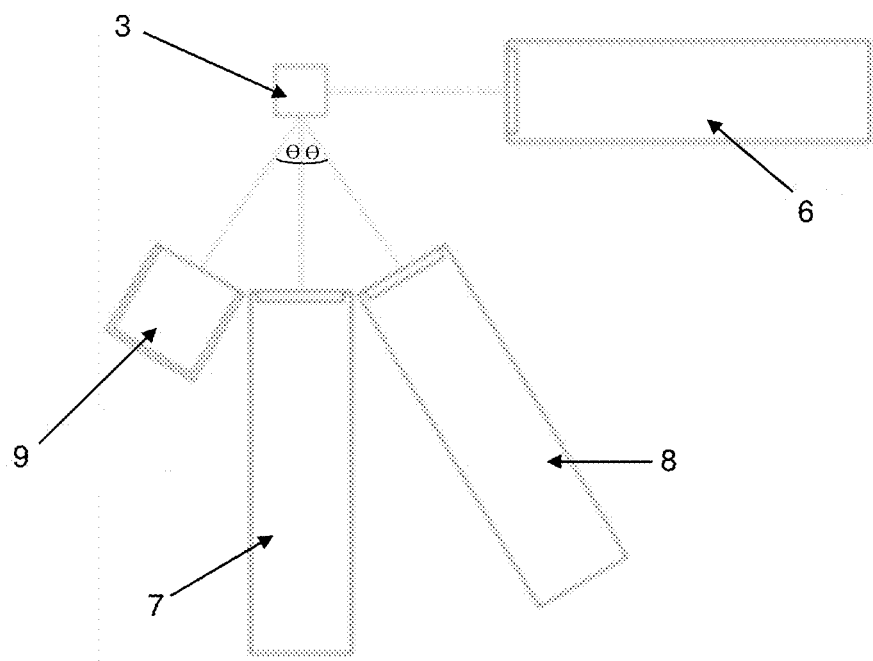
FIG. 1B schematically shows a plan view of the apparatus of FIG. 1A.

FIG. 1A schematically shows an isometric view of an apparatus for determining a bonding position of a die according to the preferred embodiment of the invention. FIG. 1B schematically shows a plan view of the apparatus of FIG. 1A.

According to the preferred embodiment, the apparatus includes a plurality of cameras 6, 7, 8. Each camera 6, 7, 8 is configured to capture at least an image of a side surface of a die 3.

Further, the apparatus includes a bond arm 1 and a bond head 2. The bond head 2 is movable in X, Y, and Z directions in a three-dimensional space, for example in a Cartesian X, Y, and Z coordinate system. The bond head 2 is used to pick up the die 3 from a pick-up position, for example from a wafer table or a tray, and to place the die 3 at a placement position. The die 3 may be held securely in position on an adhesive surface such as an adhesive tape when being singulated from a sheet of wafer. Otherwise, the die 3 may already be positioned in a tray. The die 3 may not be aligned with respect to a desired direction after sawing, but rather be at a variety of angles with respect to a desired orientation. Thus, when the bond head 2 picks up the die 3, the die 3 might already be misaligned or the misalignment may take place while the die 3 is being held by the bond head 2. For example, the die 3 may have a size within a range of about 4 mm² to about 2 cm², but is not limited thereto.

The bond head 2 is operative to pick up, hold, and move the die 3 by using for example a collet or a vacuum pump. After detecting misalignment of the die 3 with respect to a desired orientation, the apparatus is capable of rotating the die 3 around a longitudinal axis of the bond head 2 to adjust its orientation. Thus, the bond head 2 may be used to correct any misalignment of the die 3 before placing the die 3 at a placement position or bonding the die 3 to a substrate.

The apparatus includes a first camera 6, a second camera 7, and a third camera 8. The cameras 6, 7, and 8 are used to determine a bonding position, which may correspond to a reference point of a die 3, which may correspond to a center $X_C$, $Y_C$ of the die 3. However, the invention is not limited thereto. The reference point may also be a position in a 3D coordinate system. For instance, the reference point may be a point located on a position in or on the die 3, on a top surface of the die 3, or on a bottom surface of the die 3. Thus, the position of the reference point may also be expressed as a distance to a center $X_C$, $Y_C$ of the die 3.

The cameras 6, 7, 8 are configured to capture images from different angles. The first camera 6 (also referred to herein as a P camera) is operative to focus on a first side surface of the die 3, as schematically illustrated in the plan view of the die 3 in FIG. 1B. The second camera 7 (also referred to herein as a Q camera) is operative to focus on another side surface of the die 3. Each camera 6, 7, 8 is operative to capture an image of at least two side edges of the die 3. The side edges captured by the cameras 6, 7, 8 substantially extend along a direction of a thickness t of the die 3.

More specifically, the apparatus is configured such that a plurality of cameras (e.g., the cameras 6, 7, 8) are positioned and configured for capturing images of side surfaces of the die 3, when the die 3 is being held by the bond head. The plurality of cameras are positioned and configured for capturing at least a first image including a first side surface of the die 3, a second image including a second side surface of the die 3 and a third image including the first and second side surfaces of the die 3.

For example, in the first image, at least a first side edge and a second side edge are captured. In the second image, at least a third side edge and a fourth side edge are captured. The first side edge or the second side edge in the first image may correspond to the third side edge or the fourth side edge in the second image. In the third image, at least the first side edge and the second side edge of the first image and/or at least the third side edge and the fourth side edge of the second image are captured.

The first, the second, and the third cameras 6, 7, 8 are positioned so that optical axes of the plurality of cameras 6, 7, 8 lie substantially on a plane. For example, the optical axes of the cameras 6, 7, 8 lie substantially on a horizontal plane. Further, the first camera 6 and the second camera 7 are positioned so that the optical axis of the first camera 6 and the optical axis of the second camera 7 are substantially perpendicular to each other. However, the embodiments are not limited thereto, and an angle between the optical axes of the first and the second cameras 6 and 7 may be smaller or greater than 90 degrees. For instance, an angle between the first and second cameras 6 and 7 may be within a range of about 75 to 135 degrees, more preferably within a range of about 80 to 100 degrees, and even more preferably within a range of about 85 to 95 degrees. Moreover, the first camera 6, the second camera 7, and the third camera 8 are positioned so that the third camera 8 is positioned between the first camera 6 and the second camera 7.

As illustratively shown in FIG. 1A, the apparatus further includes a light source 9. The light source 9 is positioned next to the second camera 7 and is operative to illuminate the die 3. However, the embodiments are not limited thereto, and the light source 9 may be positioned elsewhere to provide illumination. According to various embodiments, the light source 9 and the optical axes of the cameras 6, 7, 8 are positioned substantially on a horizontal plane.

The second camera 7, the third camera 8 and the light source 9 are positioned so that an angle θ between the optical axis of the second camera 7 and the optical axis of the third camera 8, and between the optical axis of the second camera 7 and the optical axis of the light source 9 are equal, as schematically illustrated in FIG. 1B. The angle θ of incidence of the light illuminated by the light source 9 is substantially the same as the angle θ of reflection of the light for capture by the third camera 8. The angle θ may, for instance, be within a range of about 5 degrees to 85 degrees. The light source 9 should provide sufficient illumination for the third camera 8. The light source 9 may at least be turned on when the bond head 2 is at the measurement position. For example, the light source 9 may be an external coaxial light box using a LED light as a light source. Thus, the light source 9 helps to improve the illumination of the side surfaces and side edges of the die 3 which is picked up by the bond head 2, resulting in an increase in contrast between the die 3 and its surrounding area.

The optical axis of the second camera 7, the optical axis of the third camera 8, and the optical axis of the light source 9 preferably intersect generally at a point, whereby the second camera 7, the third camera 8 and the light source 9 focus on a single side surface of the die 3, as schematically shown in FIG. 1B. The cameras 6, 7, 8 and the bond head 2 are positioned relative to each other so that the optical axes of the cameras 6, 7, 8 are substantially perpendicular to a longitudinal axis of the bond head 2. However, the embodiments are not limited thereto, and other angles between the optical axes of the light source 9, the first camera 6, the second camera 7, and the third camera 8 may be provided.

The cameras 6, 7, and 8 may have a field of view (FOV) of 2.9×2.2 mm$^2$, a resolution of 640×480, and pixel of resolution of 4.58 μm/pixel. The first camera 6 and the second camera 7 may include Depth of Field Video Graphics Array-Cameras (DOF VGA cameras), and the third camera 8 may include a tiled DOF VGA camera using tiled rendering. Using a tiled DOF VGA camera assists in reducing the memory and bandwidth required for image capturing. However, the embodiments are not limited to these types of cameras, and any camera of adequate resolution for the application may be used.

A processor is used to calculate an orientation of the die 3 based on the captured images, and the apparatus is operative to adjust an alignment of the die 3 based on the calculated orientation of the die 3. Alignment may be along an X axis and/or a Y axis. The processor may be configured to determine a reference point, for example, a center of the die 3 based on the captured images, as schematically illustrated in FIG. 2.

Figure 2:
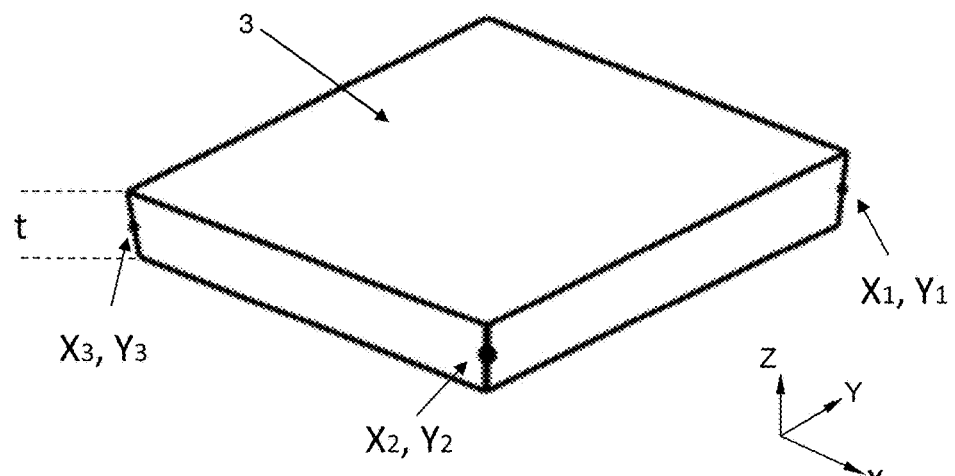
FIG. 2 illustratively shows an isometric view of a die.

FIG. 2 illustratively shows an isometric view of a die 3. The die 3 may have different top and bottom surfaces after a sawing process. According to manufacturing conditions, the top surface and the bottom surface of the die 3 may have different dimensions. For instance, the bottom surface of the die 3 may be irregular after a sawing process.

According to various embodiments, edge points $X_1$, $Y_1$, $X_2$, $Y_2$, $X_3$, $Y_3$ of the die 3 are calculated. The first camera 6 is used to capture an image of at least a first side edge of the die 3 and a second side edge of the die 3, the second camera 7 is used to capture an image of at least the second side edge of the die 3 and a third side edge of the die 3, and the third camera 8 is used to capture an image of at least the first side edge of the die 3 and the second side edge of the die 3 and/or the second side edge of the die 3 and the third side edge of the die 3.

The images of the die 3 captured by the cameras 6, 7, and 8 are captured from different angles. In more detail, the first camera 6, referred to herein as the P camera in FIG. 3, is operative to capture an image of a side surface of the die 3, the second camera 7, referred to as the Q camera in FIG. 3, is operative to capture an image of another side surface of the die 3, and the third camera 8, referred to herein as the R camera in FIG. 3, is operative to capture an image which is at an angle to the other side views. Image data captured by the cameras 6, 7, and 8 may be saved in the processor's memory. However, the embodiment is not limited to the type of memory, and any memory suitable for the application may be used.

Based on the image data, the processor is used to extract data incorporated in the captured images by using digital image processing. The processor determines at least one edge point in the captured images by using digital image analysis. In various embodiments, variations of intensity in the image can be detected as edges in the image and a location of the variation of intensity can be determined in the image. Known edge detection methods can be used to determine edges of the die 3, a thickness t of the die 3, and a distance between positions in an image. Thus, by using digital image analysis, a thickness t of the die 3 at edge points of the die 3 is determined.

FIG. 3 illustratively shows a plan view of the die 3 of FIG. 2 which is to be measured using the apparatus according to the preferred embodiment of the invention. Edge point ($X_1$, $Y_1$), edge point ($X_2$, $Y_2$), and edge point ($X_3$, $Y_3$) are to be determined by the apparatus. A bonding position of the die 3 may be calculated after determining the coordinates of the edge points ($X_1$, $Y_1$), ($X_2$, $Y_2$), and ($X_3$, $Y_3$).

After a thickness t of the die 3 has been determined, the processor determines a midpoint of the die 3 relative to positions of the respective side edges of the die 3. By way of example, the processor may calculate a midpoint of the thickness t of the die 3. Further, the processor 3 may calculate positions of edges of the die 3 in the captured images. The processor may be operative to calculate intersections $p_1$, $p_2$, $q_1$, $q_2$, $r_1$, $r_2$ between a line indicating a midpoint of the thickness t of the die 3 and a respective side edge of the die 3. After capturing an image using the P camera, a processor is used to calculate a first edge point $p_1$ and/or a second edge point $p_2$ from the captured image. After capturing an image using the Q camera, the processor is used to calculate a first edge point $q_1$ and/or a second edge point $q_2$ from the captured image. After capturing an image using the R camera, the processor is used to calculate a first edge point $r_1$ and/or a second edge point $r_2$ from the captured image. Thus, by using side-look 3D stereo optics, a midpoint along the thickness of the die 3 is determined.

As schematically illustrated in FIG. 3, $p_1$ and $p_2$ are coordinates on an axis P. $Q_1$ and $q_2$ are coordinates on an axis Q. $R_1$ and $r_2$ are coordinates on viewing axis R.

The processor is used to determine values of positions $p_1$, $p_2$, $q_1$, $q_2$, $r_1$ and $r_2$ and to calculate various X and Y coordinates based on the calculated positions. The calculated positions $p_1$, $p_2$, $q_1$, $q_2$, $r_1$ and $r_2$ and/or the various X and Y coordinates may be saved in memory. The calculated positions $p_1$, $p_2$, $q_1$, $q_2$, $r_1$ and $r_2$ are used as input parameters to be inserted in the following equations (1) to (3) to obtain X and Y values of the respective edge points ($X_1$, $Y_1$), ($X_2$, $Y_2$), and ($X_3$, $Y_3$) of the die 3:

$$p = A_P*X + B_P*Y + C_P \quad (1)$$

$$q = A_Q*X + B_Q*Y + C_Q \quad (2)$$

$$r = A_R*X + B_R*Y + C_R \quad (3)$$

According to various embodiments, equations (2) and (3) are used to calculate the coordinates of the edge point ($X_1$, $Y_1$) of the die 3. Q and R cameras are used to capture side view images of the die 3. For example, as illustrated in FIG. 3, the Q camera is used to determine $q_1$ and/or $q_2$, and R camera is used to determine $r_1$ and/or $r_2$. By inputting $q_1$, $A_Q$, $B_Q$ and $C_Q$ into equation (2), inputting $r_1$, $A_R$, $B_R$ and $C_R$ into equation (3) and by solving equations (2) and (3), it is possible to determine coordinates $X_1$ and $Y_1$ using the following equations (4) and (5):

$$q_1 = A_Q*X_1 + B_Q*Y_1 + C_Q \quad (4)$$

$$r_1 = A_R*X_1 + B_R*R_1 + Y_1 + C_R \quad (5)$$

Furthermore, by inputting $q_2$, $A_Q$, $B_Q$ and $C_Q$ in equation (2) and $r_2$, $A_R$, $B_R$ and $C_R$ in equation (3) and solve equation (2) and (3), respectively, it is possible to determine coordinates $X_2$ and $Y_2$ using the following equations (6) and (7):

$$q_2 = A_Q * X_2 + B_Q * Y_2 + C_Q \quad (6)$$

$$r_2 = A_R * X_2 + B_R * Y_2 + C_R \quad (7)$$

Thus, coordinates of edge point $(X_1, Y_1)$ and edge point $(X_2, Y_2)$ can be calculated.

Assuming that a line from edge point $(X_1, Y_1)$ to edge point $(X_2, Y_2)$ is substantially perpendicular to a line from edge point $(X_2, Y_2)$ to edge point $(X_3, Y_3)$, coordinates of edge point $X_3, Y_3$ are calculated using the following equations (8) and (9):

$$\frac{Y_3 - Y_2}{X_3 - X_2} = \frac{X_1 - X_2}{Y_1 - Y_2} \quad (8)$$

$$p_2 = A_P * X_3 + B_P * Y_3 + C_P \quad (9)$$

Equation (8) is to be solved to obtain $Y_3$. $Y_3$ is to be inputted in equation (9) to obtain $X_3$. As a result, coordinates of edge point $(X_3, Y_3)$ are calculated.

Based on the calculated edge points $(X_1, Y_1)$, $(X_2, Y_2)$, and $(X_3, Y_3)$, the X and Y positions of the respective bonding position may be calculated. Further, using the calculated edge points $(X_1, Y_1)$, $(X_2, Y_2)$, and $(X_3, Y_3)$, the respective orientation of the die 3 relative to a preferred orientation may be calculated. As a result, after picking up the die 3 using the bond head 2, the die 3 is measured on-the-fly and a bonding position and an orientation of the die 3 are calculated before die 3 is moved to a placement position. In other words, the apparatus is operative to correct an alignment of the die 3 before placing the die 3 and to calculate a bonding position relating to the die 3 to bond the die 3 accurately at the placement position. In various embodiments, as the measurement of the die 3 is performed on-the-fly, no separate measurement station is necessary.

A center $(X_c, Y_c)$ of the die 3 may be used as a reference position, which relates to a midpoint of a length, a midpoint of a width, and a midpoint of an height of the die 3, as schematically shown in FIG. 3. The center $(X_c, Y_c)$ is calculated using the processor and the following equations (10) and (11):

$$X_C = (X_1 + X_3)/2 \quad (10)$$

$$Y_C = (Y_1 + Y_3)/2 \quad (11)$$

FIG. 4 shows enlarged isometric views of the bond head 2 of the apparatus according to another embodiment. With regard to FIG. 4, a calibration process of the apparatus according to the embodiment is now described.

In the calibration process of the apparatus according to the further embodiment, parameters $A_P, B_P, C_P, A_Q, B_Q, C_Q$, and $A_R, B_R$, and $C_R$ may be determined using different X and Y positions of the bond head 2. As schematically shown in FIG. 4, the die 3 may be positioned at nine different positions 10a, 10b, etc. by the bond head 2. However, the embodiment is not so limited, and the bond head 2 may move to as many positions as desired in a calibration process to obtain the required level of accuracy. For the calibration process, equations (1) to (3) are used. The bond head 2 holding the die 3 is moved to for example a left first position 10a, as illustrated in FIG. 4. In the first position 10a, images of the die 3 are captured by the cameras 6, 7, 8. The processor is used to calculate positions $p_1, p_2, q_1, q_2, r_1, r_2$ in the first position of the die 3, as described in relation to the embodiment. The parameters $A_P, B_P, C_P, A_Q, B_Q, C_Q$, and $A_R, B_R$, and $C_R$ are calculated by solving equations (1) to (3) by inserting the calculated positions $p_1, p_2, q_1, q_2, r_1, r_2$ and the first coordinates $(X_1, Y_1)$ of the bond head 2 at position 10a into equations (1) to (3).

The bond head 2 holding the die 3 is moved to a second position 10b, as schematically illustrated in FIG. 4. In the second position 10b, images of the die 3 are similarly captured by the cameras 6, 7, 8. The processor is used to calculate positions $p_1, p_2, q_1, q_2, r_1, r_2$, in the second position 10b of the die 3, as already described in relation to the embodiment. Again, the parameters $A_P, B_P, C_P, A_Q, B_Q, C_Q$, and $A_R, B_R$, and $C_R$ are calculated by solving equations (1) to (3) by inserting the calculated positions $p_1, p_2, q_1, q_2, r_1, r_2$ and the second coordinates $(X_2, Y_2)$ of the bond head 2 at position 10b into equations (1) to (3).

The bond head 2 holding the die 3 is moved to further positions, and for each of the positions 10a, 10b, etc., parameters $A_P, B_P, C_P, A_Q, B_Q, C_Q$, and $A_R, B_R$, and $C_R$ are calculated and saved in the processor's memory. After moving the die 3 to the last position of the positions 10a, 10b, etc., an average of the values of parameters $A_P, B_P, C_P, A_Q, B_Q, C_Q$, and $A_R, B_R$, and $C_R$ may be calculated and saved in the processor's memory. The positions 10a, 10b, etc. are located at a same height. Finally, parameters $A_P, B_P, C_P, A_Q, B_Q, C_Q$, and $A_R, B_R$, and $C_R$ are calibrated and available for calculation of the bonding position on-the-fly by using the side-look 3D stereo optics.

In the calibration process, calibration of parameters $A_P, B_P, C_P, A_Q, B_Q, C_Q$, and $A_R, B_R$, and $C_R$ may be repeated to improve the accuracy. After the calibration process is completed, calibrated parameters $A_P, B_P, C_P, A_Q, B_Q, C_Q$, and $A_R, B_R$, and $C_R$ and equations (1) to (9) are used to calculate the coordinates of edge points $(X_1, Y_1)$, $(X_2, Y_2)$, and $(X_3, Y_3)$ of the die 3.

In the following, a method of determining a bonding position of a die 3 used exemplarily in the apparatus described above will be described in detail with reference to FIG. 5. The method captures, when the die 3 is being held by the bond head, at least a first image including a first side surface of the die 3, a second image including a second side surface of the die 3, and a third image including the first and second side surfaces of the die 3. Further, the method determines a bonding position of the die 3 based on the first image, the second image, and the third image.

The method may further capture the images using at least one camera 6, 7, 8.

The method may further capture the images from different angles.

The method may further determine a position of a first side edge and a position of a second side edge of the first side surface in the first image.

The method may further determine a position of a third side edge and a position of a fourth side edge of the second side surface in the second image.

The method may further determine a position of the first side edge of the first side surface and a position of the second side edge of the first side surface in the third image or determine a position of the third side edge of the second side surface and a position of the fourth side edge of the second side surface in the third image.

The method may further determine positions of at least three edge points of the die 3 at respective midpoint positions of a thickness of the die 3 at the respective determined positions of the side edges.

The method may further determine a reference point of the die 3 based on the determined positions of the edge points.

The method may further capture the first image from a direction substantially perpendicular to a direction of capturing the second image.

The method may capture the third image from a position between a position of capturing the first image and a position of capturing the second image.

The method may further illuminate at least one side surface of the die 3.

The method may capture and determine on-the-fly between a pick-up position and a place position of the die 3. Thus, the method provides enhanced performance in determining a bonding position of the die 3.

The method may further capture an image using a third camera 8 positioned between the first camera 6 and the second camera 7.

The method may further determine positions $p_1$, $p_2$, $q_1$, $q_2$, $r_1$, $r_2$ in an image, wherein the positions $p_1$, $p_2$, $q_1$, $q_2$, $r_1$, $r_2$ are located at a midpoint of a thickness t of the die 3 on a position of a detected side edge of the die 3 in the image.

The method provides positioning of the die 3 at a placement position more exactly. Furthermore, by capturing images of the die 3 on-the-fly, and as an additional look-up camera station is not needed, time is saved in pick and place process. Additionally, by using side look 3D stereo optics, a midpoint of a Z-level of the die 3 is measured, resulting in an elimination of bottom die edge variation from sawing process. Illuminating side surfaces of the die 3 using the light source 9 helps to provide sufficient illumination lighting for the third camera 8. The result is more reliable compared to conventional measurement methods. Thus, the method provides a minimization of loss of productivity or throughput.

The invention described herein is susceptible to variations, modifications and/or additions other than those specifically described and it is to be understood that the invention includes all such variations, modifications and/or additions which fall within the spirit and scope of the above description.

The invention claimed is:

1. Apparatus for determining a bonding position of a die, the apparatus comprising:
    a bond head for picking up and bonding the die;
    a plurality of cameras positioned and configured for capturing images of side surfaces of the die between a top surface and a bottom surface of the die when the die is being held by the bond head, such images including at least a first image comprising a first side surface of the die, a second image comprising a second side surface of the die, and a third image comprising the first and second side surfaces of the die so as to determine the bonding position of the die based on the first image, the second image, and the third image.

2. The apparatus according to claim 1, further comprising a processor configured to receive the first image, the second image, and the third image, and to determine, according to the first, second and third images, the bonding position of the die.

3. The apparatus according to claim 1, wherein the plurality of cameras are positioned relative to each other so that optical axes of the plurality of cameras lie substantially on a horizontal plane.

4. The apparatus according to claim 1, wherein a first camera for capturing the first image and a second camera for capturing the second image are positioned relative to each other so that an optical axis of the first camera and an optical axis of the second camera are substantially perpendicular.

5. The apparatus according to claim 4, wherein the first camera, the second camera, and a third camera for capturing the third image are positioned relative to each other so that the third camera is positioned between the first camera and the second camera.

6. The apparatus according to claim 1, further comprising at least a light source for illuminating at least one side surface of the die.

7. The apparatus according to claim 6, wherein the second camera and the light source are positioned relative to each other so that the light source is positioned next to the second camera.

8. The apparatus according to claim 6, wherein the light source and the plurality of cameras are positioned relative to each other so that an optical axis of the light source and the optical axes of the plurality of cameras lie substantially on a horizontal plane.

9. The apparatus according to claim 6, wherein the second camera, the third camera and the light source are positioned relative to each other, so that an angle between the optical axis of the second camera and the optical axis of the third camera and an angle between the optical axis of the second camera and the optical axis of the light source are equal.

10. The apparatus according to claim 6, wherein the second camera, the third camera and the light source are positioned relative to each other, so that the optical axis of the second camera, the optical axis of the third camera, and the optical axis of the light source intersect at a point.

11. The apparatus according to claim 1, wherein the plurality of cameras and the bond head are positioned relative to each other, so that the optical axes of the plurality of cameras are substantially perpendicular to a longitudinal axis of the bond head.

12. A method of determining a bonding position of a die, the method comprising:
    capturing images of side surfaces of the die between a top surface and a bottom surface of the die when the die is being held by the bond head, such images including at least a first image comprising a first side surface of the die, a second image comprising a second side surface of the die, and a third image comprising the first and second side surfaces of the die; and
    determining the bonding position of the die based on the first image, the second image, and the third image.

13. The method according to claim 12, wherein determining the bonding position of the die further comprises:
    determining a position of a first side edge and a position of a second side edge of the first side surface in the first image;
    determining a position of a third side edge and a position of a fourth side edge of the second side surface in the second image; and
    determining a position of the first side edge of the first side surface and a position of the second side edge of the first side surface in the third image or determining a position of the third side edge of the second side surface and a position of the fourth side edge of the second side surface in the third image.

14. The method according to claim 13, wherein determining the bonding position of the die further comprises determining positions of at least three edge points of the die at respective midpoint positions of a thickness of the die at the respective determined positions of the side edges.

15. The method according to claim 12, wherein capturing the first image is performed from a direction substantially perpendicular to a direction of capturing the second image.

16. The method according to claim 12, wherein capturing the third image is performed from a position between a position of capturing the first image and a position of capturing the second image.

17. The method according to claim 12, wherein the capturing and the determining are performed on-the-fly between a pick-up position and a place position of the die.

18. The method according to claim 12, wherein the determining of the bonding position is performed by an automated data processor based on the first image, the second image and the third image received by the automated data processor.

* * * * *